US010823300B2

(12) United States Patent
John et al.

(10) Patent No.: US 10,823,300 B2
(45) Date of Patent: Nov. 3, 2020

(54) ASPIRATOR PRESSURE RELIEF VALVE WITH RELIEF CONTROL UNIT

(71) Applicant: Goodrich Corporation, Charlotte, NC (US)

(72) Inventors: Poly Puthur John, Karnataka (IN); Shyamkumar Dattatri, Karnataka (IN)

(73) Assignee: GOODRICH CORPORATION, Charlotte, NC (US)

( * ) Notice: Subject to any disclaimer, the term of this patent is extended or adjusted under 35 U.S.C. 154(b) by 1 day.

(21) Appl. No.: 16/217,084

(22) Filed: Dec. 12, 2018

(65) Prior Publication Data

US 2020/0124192 A1    Apr. 23, 2020

(30) Foreign Application Priority Data

Oct. 18, 2018  (IN) .............................. 201811039533

(51) Int. Cl.
| | |
|---|---|
| *F16K 15/20* | (2006.01) |
| *F16K 17/04* | (2006.01) |
| *B64D 25/14* | (2006.01) |
| *F16K 31/122* | (2006.01) |

(52) U.S. Cl.
CPC .............. *F16K 17/04* (2013.01); *B64D 25/14* (2013.01); *F16K 31/122* (2013.01); *Y10T 137/36* (2015.04)

(58) Field of Classification Search
CPC .......... A62B 1/20; B64D 25/14; Y10T 137/36
USPC .............................. 193/25 B; 244/137.2, 905
See application file for complete search history.

(56) References Cited

U.S. PATENT DOCUMENTS

| | | | | |
|---|---|---|---|---|
| 3,572,974 A | * | 3/1971 | Day ......................... | B63C 9/24 417/179 |
| 4,019,713 A | * | 4/1977 | Deinlein-Kalb ...... | F01D 17/145 251/28 |
| 4,368,009 A | * | 1/1983 | Heimovics, Jr. ...... | B61B 12/005 417/179 |
| 4,566,862 A | * | 1/1986 | Halavais ................... | F04F 5/48 417/174 |
| 4,903,939 A | * | 2/1990 | Ariizumi ............. | F16K 31/1221 251/63.4 |
| 5,820,162 A | * | 10/1998 | Fink ...................... | B60R 21/205 280/742 |
| 6,240,951 B1 | * | 6/2001 | Yori ...................... | F16K 15/207 137/224 |
| 6,659,404 B1 | * | 12/2003 | Roemke ................. | B64D 25/14 137/224 |
| 6,932,318 B2 | * | 8/2005 | Igarashi .............. | F16K 31/1221 251/60 |
| 2007/0045473 A1 | * | 3/2007 | Clegg .................... | B64D 25/14 244/137.2 |

(Continued)

*Primary Examiner* — Robert K Arundale
(74) *Attorney, Agent, or Firm* — Cantor Colburn LLP (57) ABSTRACT

An aspirator for use in an aircraft evacuation inflatable device inflation system. The aspirator includes: a barrel; a first inlet configured to receive a primary flow of pressurized gas a first pressure P1 during inflation of the aircraft evacuation inflatable device; a second inlet configured to a secondary flow in the form of atmospheric air; and a pressure release valve and interlock combination attached to the barrel. The interlock receives the primary flow and a downstream flow from the barrel, wherein the interlock causes the pressure release valve (PRV) to remain closed during an initial phase of inflation of aircraft evacuation inflatable device.

13 Claims, 5 Drawing Sheets

(56) References Cited

U.S. PATENT DOCUMENTS

| | | | | |
|---|---|---|---|---|
| 2007/0187551 A1* | 8/2007 | Myers | ................... | B64D 25/14 |
| | | | | 244/129.4 |
| 2010/0266424 A1* | 10/2010 | Renz | ...................... | F04F 5/463 |
| | | | | 417/191 |
| 2017/0203849 A1* | 7/2017 | John | ...................... | B64D 25/14 |
| 2017/0297726 A1* | 10/2017 | Volny | ................... | B64D 25/14 |
| 2018/0202466 A1* | 7/2018 | Haynes | ..................... | F04F 5/14 |
| 2019/0249689 A1* | 8/2019 | John | ....................... | F16K 15/18 |

* cited by examiner

ASPIRATOR PRESSURE RELIEF VALVE WITH RELIEF CONTROL UNIT

FOREIGN PRIORITY

This application claims priority to Indian Patent Application No. 201811039533 filed Oct. 18, 2018, the entire contents of which is incorporated herein by reference.

BACKGROUND

Exemplary embodiments pertain to the art of emergency evacuation equipment for aircraft. In particular, this invention relates to a pressure relief valve that can used in a system for deploying an inflatable aircraft emergency evacuation slide or slide/raft combination.

The requirement for reliably evacuating airline passengers in the event of an emergency is well known. Emergencies at take-off and landing often demand swift removal of the passengers from the aircraft because of the potential from injuries from fire, explosion, or sinking in water. A conventional method of quickly evacuating a large number of passengers from an aircraft is to provide multiple emergency exits, each of which is equipped with an inflatable evacuation slide. Current state-of-the-art emergency evacuation slide systems comprise an inflatable evacuation slide that is stored in an uninflated, folded state together with a source of inflation gas. The source of inflation gas typically comprises either a compressed gas source (e.g., gas generator, stored compressed gas, or a combination thereof) or a pyrotechnic gas or some combination of both.

Regardless of the source, to inflate the inflatable a regulating valve is opened that, through hoses, allows pressurized gas to pass into the inflatable. To further augment the volume of gas delivered to the evacuation slide, many evacuation systems utilize aspirators. As the compressed gas flows through the aspirator, a venturi draws additional air into the aspirator to pump about two to three times as much gas into the evacuation slide as is supplied by the gas source alone.

The aspirator can be formed by a cylindrical hollow tube having a flapper check valve. The aspirator can also include a nozzle unit assembly. The high velocity primary gas flow inside the aspirator opens the check valve flappers to induce secondary ambient air flow to the inflatable unit. The flappers get closed as the slide internal back pressure reaches to sufficient value at the end of inflation. The inflatable unit is assembled to the aspirator hollow tube at the downstream of nozzle unit.

To ensure that the inflatable is not overfilled, the inflatable can be equipped with one or more pressure relief valves. For example, the inflatable can include a pressure relief valve on its toe end (or other location) that opens at a pre-set pressure. This PRV assembled to inflatable induces inconvenience during the handling and packing of the inflatable assembly as PRV creates a rigid, unfoldable region. Also locations where the PRV joins with the inflatable are prone to exhibit leakage resulting the gas loss in an inflated inflatable.

BRIEF DESCRIPTION

Disclosed is an aspirator for use in an aircraft evacuation inflatable device inflation system. The aspirator includes: a barrel; a first inlet configured to receive a primary flow of pressurized gas at first pressure $P1$ during inflation of the aircraft evacuation inflatable device; a second inlet configured to a secondary flow in the form of atmospheric air; and a pressure release valve and interlock combination attached to the barrel. The interlock receives the primary flow and a downstream flow from the barrel, wherein the interlock causes the pressure release valve (PRV) to remain closed during an initial phase of inflation of aircraft evacuation inflatable device.

In an aspirator according to any prior embodiment, the pressure relief valve is directly connected to the barrel and receives inlet air from the barrel at a pressure $P2$.

In an aspirator according to any prior embodiment, the interlock includes: an interlock body; and a piston disposed in and that can move from an open position to a close position within the interlock body.

In an aspirator according to any prior embodiment, the piston includes a seal assembly that is shaped and configured to divide the interlock body into an upper region and a lower region and the aspirator further includes a downstream duct connected to the barrel that, in operation, receives air from the barrel at the second pressure $P2$ and provides it to the interlock body in the lower region.

In an aspirator according to any prior embodiment, the interlock body includes a piston receiving region formed, sized and configured to receive an upper portion of the piston and allow for the piston to move from the closed to the open position, the aspirator further includes an upstream duct that carries a portion of the primary flow received at the first inlet to the piston receiving region and in operation, the primary flow exerts a downward force on the piston.

In an aspirator according to any prior embodiment, in operation air received in the lower region exerts an upward force on the piston.

In an aspirator according to any prior embodiment, the interlock includes one or more springs disposed in the lower region.

In an aspirator according to any prior embodiment, wherein: the PRV defines a seal area $As0$ on the barrel, the piston receiving region defines an upper piston seal area $As1$, the seal assembly has an area $As2$, and the lower portion includes an opening that the piston can pass through to contact the PRV that has piston seal area $As3$; and when $(P1*As1+P2*As3+Ff)$ is greater than $(P2*As2+Fs)$, the interlock prevents the PRV from opening; wherein $Fs$ is the force required to compress the one or more springs and $Ff$ is the friction force that oppose movement of the piston due to O-ring seals provided in the interlock body In an aspirator according to any prior embodiment, wherein: the PRV defines a seal area $As0$ on the barrel, the piston receiving region defines an upper piston seal area $As1$, the seal assembly has an area $As2$, and the lower portion includes an opening that the piston can pass through to contact the PRV that has piston seal area $As3$; and wherein when $(P1*As1+P2*As3+Ff)$ is less than $(P2*As2+Fs)$, the interlock allows the PRV to open where $P2$ can be set to values lower than the opening pressure of the PRV, wherein $Fs$ is the force required to compress the one or more springs and $Ff$ is the friction force that opposes movement of the piston due to O-ring seals provided in the interlock body.

In an aspirator according to any prior embodiment, the interlock if formed separately from the PRV and coupled thereto such that after the initial phase the PRV operation is not affected by the interlock.

Any of aspirators previously disclosed can be included in an aircraft evacuation inflatable device inflation system. In one embodiment, system includes a pressure vessel containing pressurized inflation gas, a control valve and an evacuation inflatable. The aspirator can include an aspirator having a barrel, a first inlet configured to receive a primary flow of pressurized gas from the pressure vessel through the control valve at first pressure P1 during inflation of the evacuation inflatable, a second inlet configured to a secondary flow in the form of atmospheric air and a pressure release valve and interlock combination attached to the barrel. The interlock receives the primary flow and a downstream flow from the barrel, wherein the interlock causes the pressure relief valve to remain closed during an initial phase of inflation of aircraft evacuation inflatable device.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
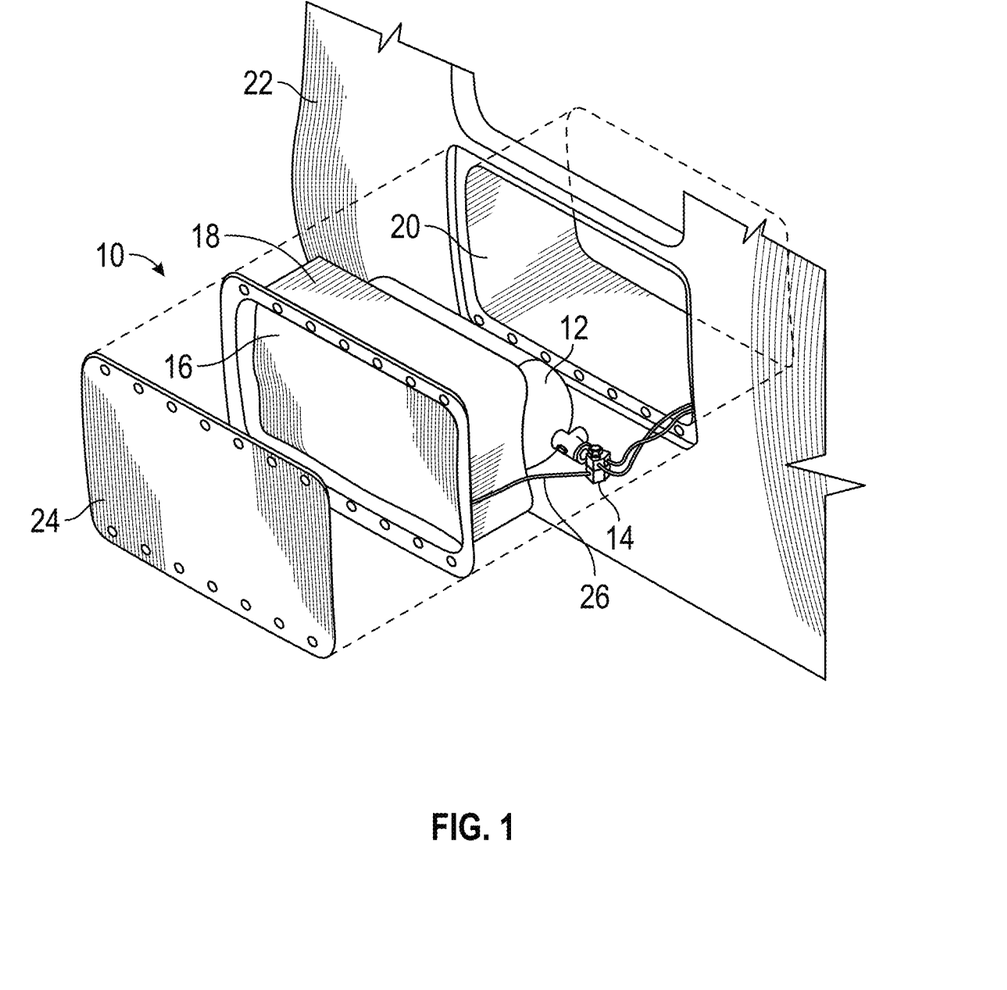
FIG. 1 shown an exploded side view of an aircraft evacuation inflatable inflation system.

With reference to FIG. 1, an inflatable aircraft evacuation slide system 10 incorporating features of the present invention comprises a pressure vessel 12 containing pressurized inflation gas, a control valve 14 and an evacuation inflatable 16 such as a slide or raft is stored in an uninflated condition within a packboard compartment 18. The packboard compartment 18 is secured within a recess 20 in the outer hull of the aircraft 22 and covered by a cover panel 24. The pressure vessel 12 further includes a pyrotechnic gas generator (not shown) that heats and augments the stored inflation gas within the pressure vessel 12. In normal operation, the opening of the aircraft emergency evacuation exit door in the armed condition causes a signal to be sent to the control valve 14 causing the control valve 14 to open allowing inflation gas to flow from the pressure vessel 12 into the inflation line 26 to operate the locks allowing the cover panel 24 to fall away and to inflate the evacuation inflatable. As discussed above, having the PRV located on the evacuation inflatable 16 can create localized hard spots that make the storage or other manipulation of the inflatable 16 more difficult.

Disclosed herein is a pressure relief valve that includes a controller that is moved a location off the evacuation inflatable, and in particular, is moved on to the aspirator.

Figure 2:
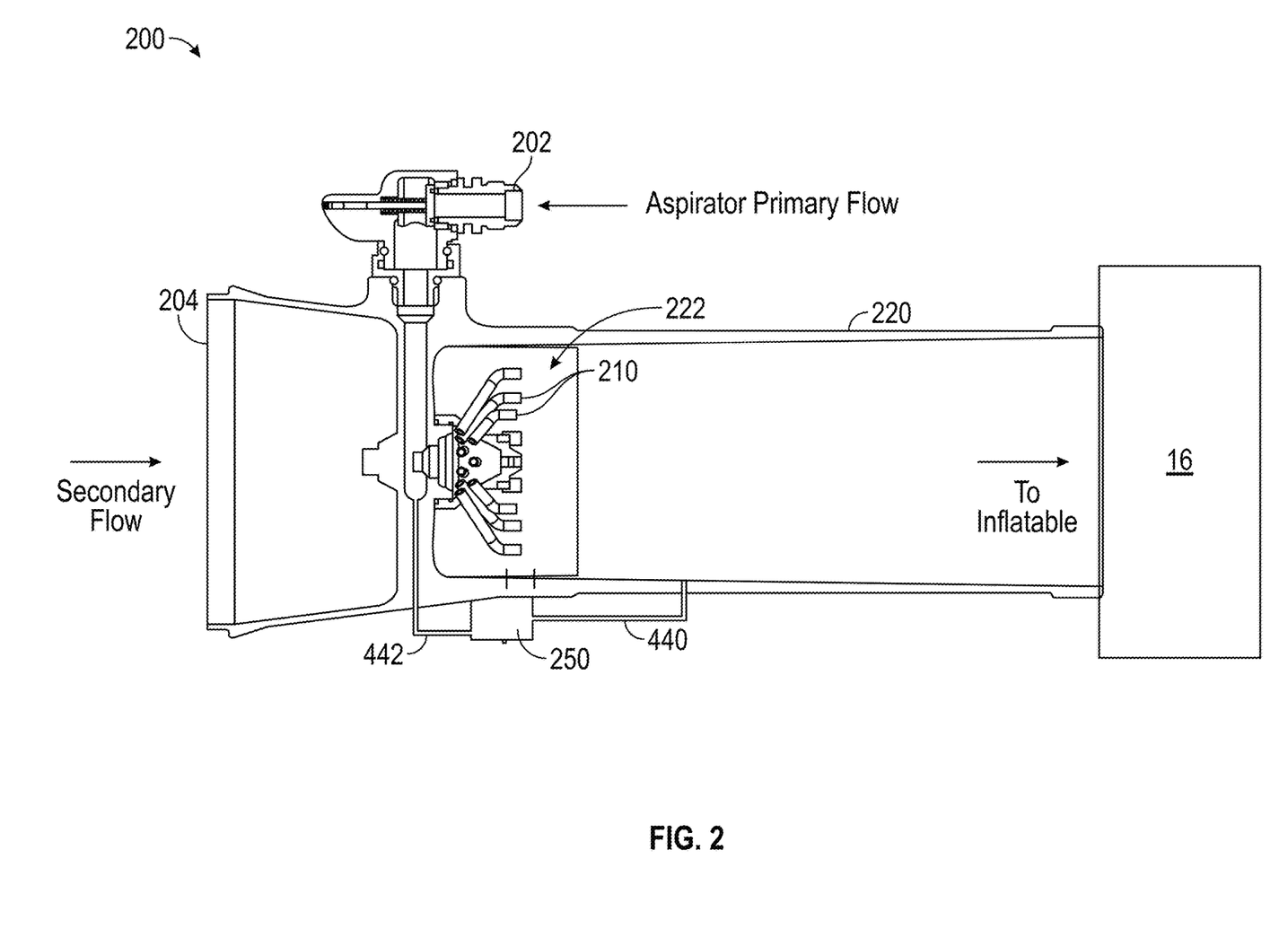
FIG. 2 is a cross-sectional side view of an aspirator according to one embodiment of the present invention.

Generally, in the context of evacuation inflatables, and as shown in FIG. 2, an aspirator 200 of one embodiment includes first and second inlets 202 and 204 that, respectively, receive a primary flow in the form of pressurized gas from the pressure vessel 12 (FIG. 1) and a secondary flow in the form of atmospheric air. The atmospheric air is drawn into the second inlet 204 to augment the high pressure gas flowing into the evacuation inflatable 16 from the pressure vessel 12 (e.g. the gas introduced at the first inlet 202). In the operation of the aspirator 200, one or more nozzles 210 act as gas injectors, injecting a jet stream of gas at high velocity into the inlet end 222 of an aspirator barrel 220. The flow of air entering the aspirator barrel 220 reduces the pressure at the second inlet 204 to below atmospheric pressure. Atmospheric air, therefore, enters the aspirator barrel 220 to be entrained with the jet stream entering the aspirator barrel 220. The outlet of the aspirator barrel communicates with the interior volume of the inflatable device 16 so that jet stream and the entrained air collectively make up the volume of gas filling the inflatable device 16.

As shown, the PPS controller combination 250 according to one embodiment is attached to the aspirator 200 and, in particular, to the barrel 220 of the aspirator 200. The PRV/controller combination 250 includes a pressure relief inlet 302 (best shown in FIG. 4). This inlet allows primary gas-air mixture to enter the PRV portion of the PRV/controller combination 250 from the barrel 220 of the aspirator.

In a typical PRV, when the pressure at the inlet 302 exceeds a threshold pressure, the PRV opens to ensure that the internal pressure in the aspirator 200 or the inflatable 16 does not exceed maximum operation pressure of the inflatable 16.

Figure 3:
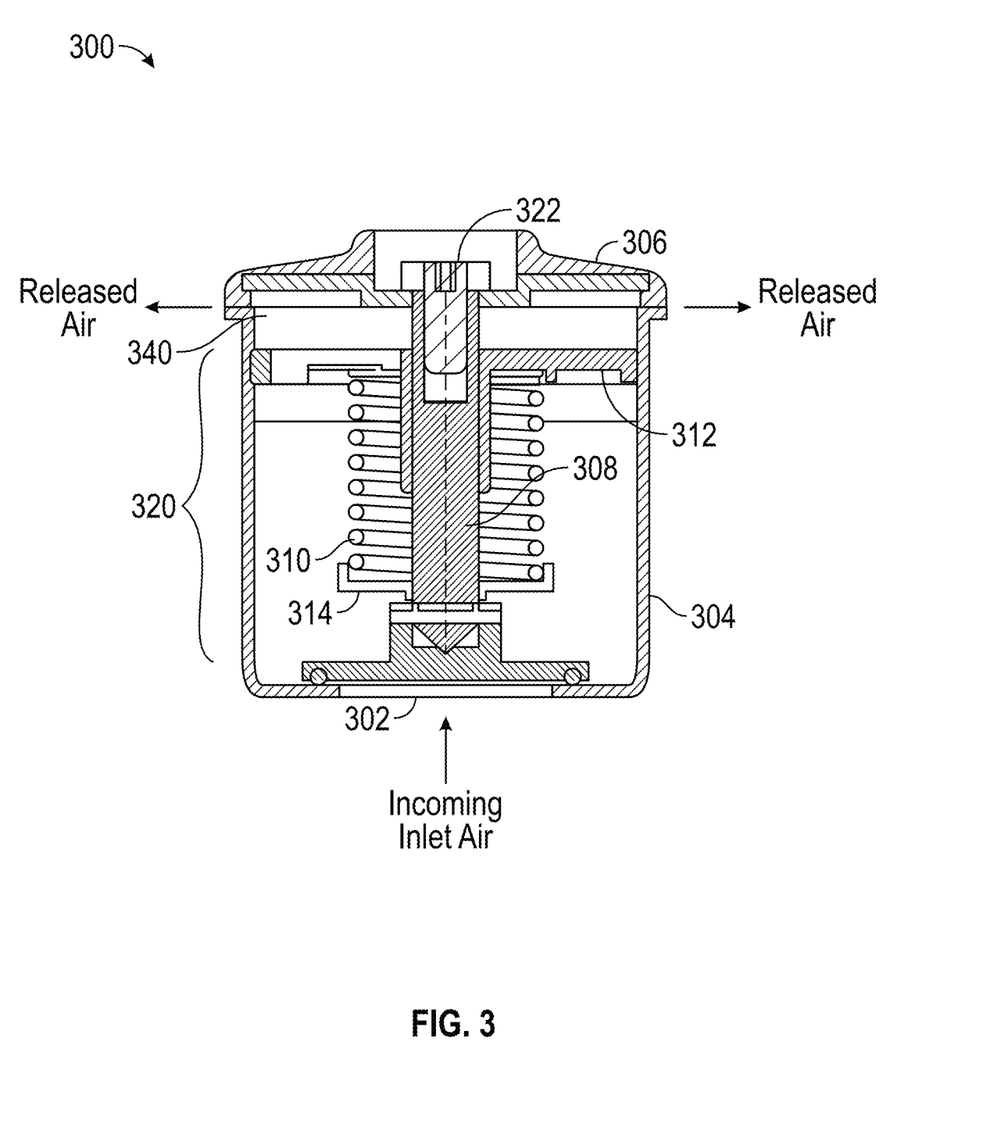
FIG. 3 is a cross-sectional side view of a pressure relief valve that can be used in one embodiment of the present invention.

By way of reference FIG. 3 shows a cross section of an example of PRV 300 that can be used as part of the combination 250 of FIG. 2. Other specific types of PMV's that may be constructed differently but operate in the same or similar manner could also be used as will be understood by the skilled artisan after reviewing the disclosure herein.

The PRV 300 includes an inlet 302 that is exposed to a source of incoming air gas mixture. This incoming air gas mixture in this instance will be referred to as inlet air and is taken from the barrel of an aspirator in one embodiment. When the pressure of the incoming air exceeds an opening pressure of the PRV 300, the PRV 300 "opens" and the incoming air is allowed to enter and pass through the PRV 300 and exit the PRV 300 as released air. The PRV 300 can also include a poppet assembly 320 therein that allows the air to flow into and through the PRV 300 such that it exits as released air.

In more detail, the PRV 300 includes an outer housing 304 and a movable release element 306 (e.g. a top) that moves relative to the outer housing when the PRV 300 opens. A movable piston 308 is connected to the movable release element 306 and seats in the inlet 302. A biasing member such as spring 310 is provided that exerts a force on the piston 308 in the opposite direction of the incoming air exerts on the piston 308. The spring 310 is connected to and applies pressure against a top support 312 and bottom support 314. When the air pressure of the incoming air is high enough to compress the spring 310 it causes the piston 308 to move upwards and allows incoming air to enter the outer housing. Such movement also causes the movable release element 306 to move upwards and let the air exit as released air through exit 340. The movable release element 306 can be connected to the piston 308 by a fastener such as screw 322 or can be attached by other methods or can be formed as a unitary part.

While the term air is used herein it shall be understood that the any fluid or gas combination will act on the PRV 300 in a similar manner.

With reference now to FIGS. 2 and 3 if the PRV/controller combination 250 (herein referred to as a PRV+C 250) consisted solely of PRV 300 (or a similar PRV), the operation thereof may exhibit some undesired tendencies that the inventors hereof have discovered. During the initial phase of inflation of the evacuation inflatable 16, the evacuation inflatable 16 is unfolding of and breaks packing restraints holding it in place (e.g., the restraints holding the cover panel 24 of FIG. 1 in place). The time delays in the restrains breaking will cause pressure surges within the aspirator 200. These pressure surges may cause an aspirator mounted PRV to open momentarily if not loaded with an additional interlock mechanism during inflation.

Figure 4:
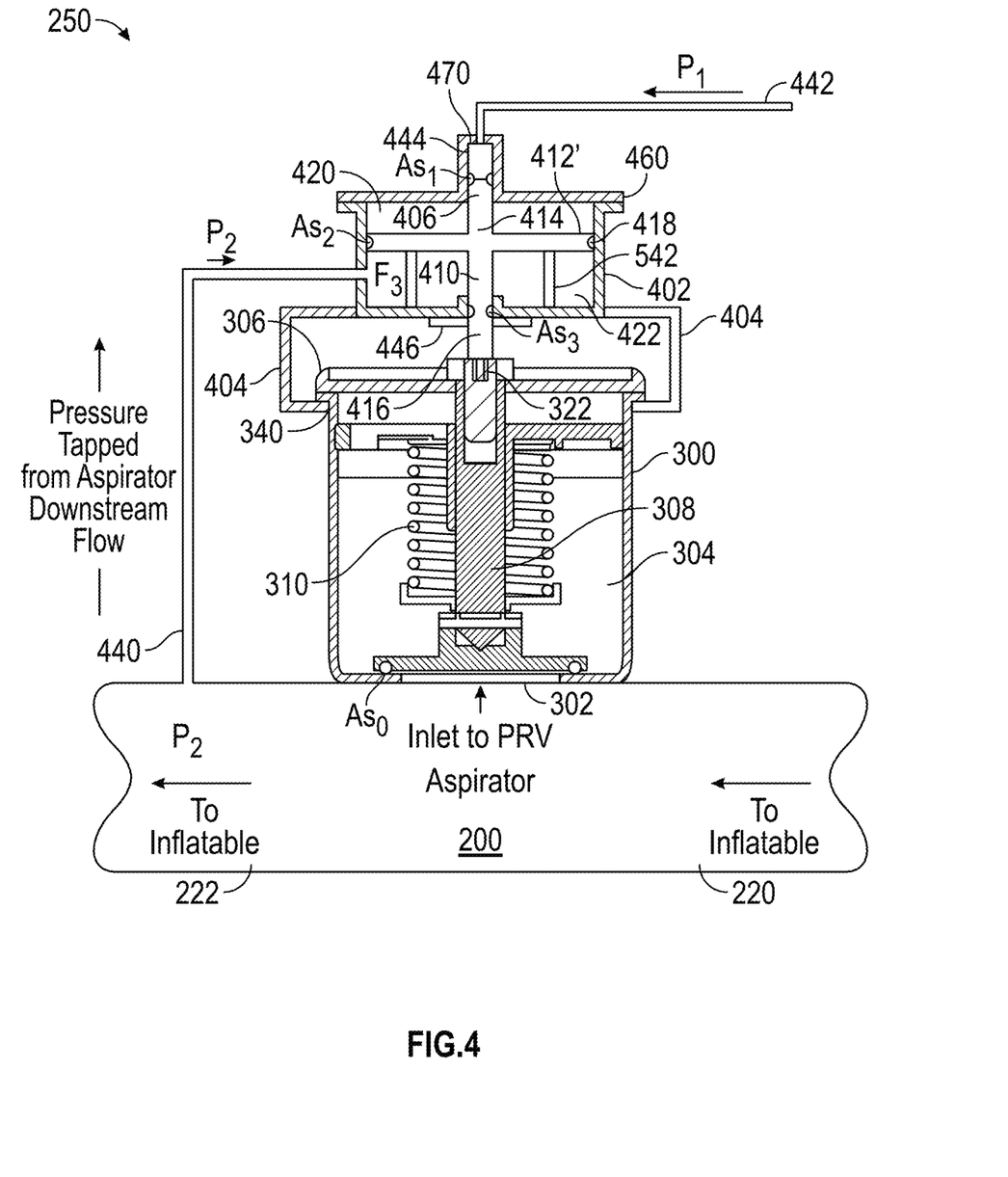
FIG. 4 cross-sectional side view a combination of a pressure relief valve and an interlock or controller according to one embodiment of the present invention in the closed state.

To this end and as shown in FIG. 4, in one embodiment, a PRV+C 250 includes a PRV such as PRV 300 with an interlock 402 attached thereto. In FIG. 4, the PRV+C 250 in an interlocking or closed position that prevents the PRV from opening during the above described initial inflation phase. This can be compared to FIG. 5 where the interlock 402 is in the open position and the PRV 300 is allowed to operate as described above.

The interlock 402 can also be referred to a controller. In FIG. 4, the PRV+C 250 is connected to the aspirator 200 in the manner shown in FIG. 2 and air flows though the aspirator 200 in the direction shown by the arrows labeled "To Inflatable." In FIG. 4 certain reference numerals are omitted related to the PRV 300 for clarity and reference can be made to FIG. 3 if needed.

Figure 5:
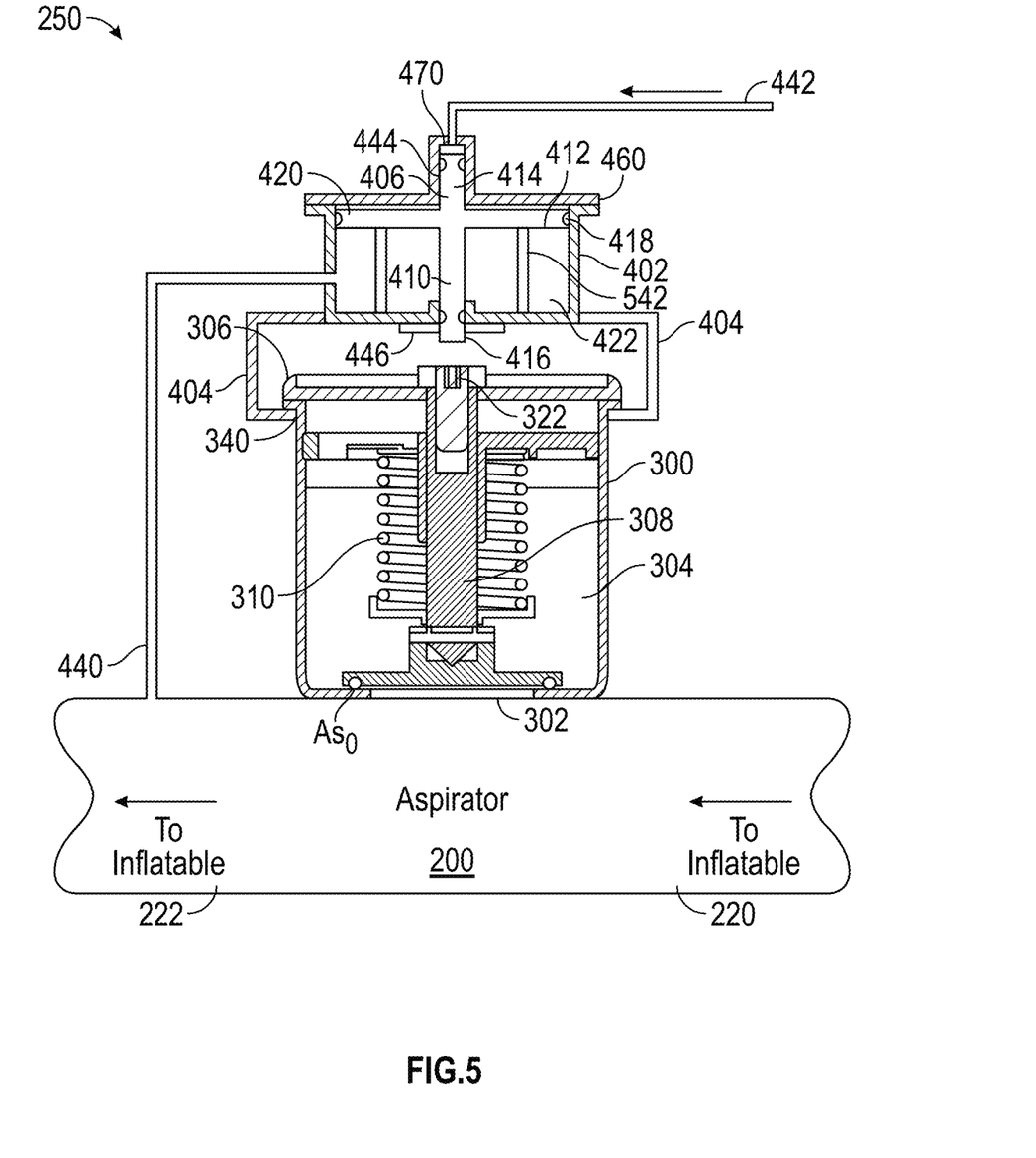
FIG. 5 cross-sectional side view a combination of a pressure relief valve and an interlock or controller according to one embodiment of the present invention in the open state.

The interlock 402 can include one or more attachment arms 404 to hold it in a fixed relationship to the PRV 300. As shown, because FIG. 4 is a cross section only two attachment arms 404 are provided. In one embodiment, three attachment arms 404 are provided. The arms are arranged such that the movable release element 306 can move away from the body 304 to allow air to escape from the PRV 300 in the manner described above and when interlock 402 is not keeping the PRV 300 closed (e.g. as shown in FIG. 5).

The interlock 402 has a body 406 that houses a moveable piston 410. The piston 410 includes an upper portion 414 and a lower portion 416 divided by a piston seal assembly 412. The piston seal assembly 412 is sized and arranged such that it contacts and is in a slideable relationship with the body 406. Arranged around an outer edge of the piston seal assembly 412 is a piston sealing member 418 such as an O-ring. The seal created by the sealing member 418 effectively divides the body into upper and lower regions 420, 422. The lower region 422 is connected to and receives pressurized air from a location downstream of the inlet end 222 of an aspirator barrel 220. In particular, the lower region 422 receives pressurized air at pressure P2 from the aspirator 200 along a downstream connection duct 440.

The piston sealing member 418 keeps the pressure P2 in the lower region 422. The lower region 422 can include one or more springs 452. These springs apply an upward source Fs on the piston seal assembly 412.

The interlock 402 also includes a top 460 that includes an upstream pressure inlet 470 connected to an upstream inlet duct 442. The upstream duct 442 and downstream duct 440 are also illustrated in FIG. 2 for context.

The upstream duct receives air at the same pressure P1 that air is provided to the aspirator 200 (e.g., the pressure of aspirator primary flow shown in FIG. 2). In operation, the interlock 402 remains in the closed position of FIG. 4 until certain ratio of P1/P2 are achieved. Such may be achieved, for example, after the packing restraints are broken.

The upstream duct 442 provides the air at P1 to a piston receiving region 470. The piston receiving region 470 can be shaped and arranged such that it allows for the piston 410 to move vertically up and down. The air received in the piston receiving region 470 causes a downward pressure to be applied on the piston. Herein the term "downward" with respect to a force refers to a direction that is towards the aspirator 200. Similarly, the term "upward" shall refer to a direction that is away from the aspirator.

Air received from the upstream duct 442 and in the piston receiving region 470 can be separated from air in the upper region 420 by an upper piston seal 444 such as an O-ring. A lower piston seal 446 seals the piston 410 as it moves relative to the body and keeps air in the lower region at pressure P2 from escaping the body.

During inflation, as the aspirator downstream pressure (P2) increases so does the pressure of the inlet air at the PRV 300 and inlet 302. This pressure directly acts on this PRV poppet seal assembly (e.g., the combination movable piston 308 and spring 310). Air at that same pressure is provided into the lower region 422. This causes an upward pressure to be exerted on the piston seal assembly 412 and thus, on piston 410. The pressure force acting on the piston seal assembly 412 can be made higher by selecting higher piston seal area than the PRV seal area.

As generally referred to above, the force balance inside the interlock 402 involves upward and downward force components. The upward force components involve the pressure force acting on the piston seal assembly (P2) and, if present, the spring force of springs 452. The downward force involves the pressure provided by air from upstream duct 442 (e.g., air at pressure P1). By selecting the sealing areas and the spring force, the interlock 402 can be designed to get the net force in the upward direction with force margin for a PRV inlet 302 pressure value that is smaller than the pressure that will open PRV 300. The net upward force shall be made to exceed the total O-ring friction force which will then push the piston seal assembly 412 upwards and causes piston 410 to move away from the PRV 300 (e.g. as in FIG. 5) and allow it to open. In this manner, the interlock 402 disengages the additional loading of the PRV 300 by interlock 402 prior to opening of the PRV 300. As the PRV inlet pressure (e.g., P2) increases further, the pressure force to push the piston assembly upwards increases and allows the piston 410 to move up and allow PRV 300 to open. In short, until P2 reaches a certain sustained value, the interlock 402 keeps the PRV 300 closed.

In FIG. 5, the piston 410 has moved upwards to a state that will allow the PRV 300 to open when P2 exceeds the opening pressure of the PRV 300. The springs 452 are shown in an expanded state in FIG. 5. Thus, the skilled artisan will realize that to disable the PRV 300 from opening, the downward force on the piston from P1 must exceed the spring force Fs of these springs.

The disclosed interlock operates on the pressure difference between the aspirator inlet and outlet pressures P1, P2, the influence of the ambient temperature can be managed. For example, for the same P1 aspirator inlet pressure will be in the lower range for low ambient temperatures and higher at higher ambient temperatures. Accordingly the interlock can be designed for the maximum pressure difference case of higher ambient temperatures so that it can perform with better force margins at lower ambient temperatures.

In operation, because the aspirator inlet pressures (P1) are higher initially, this pressure force is utilized to load the PRV 300 (via piston 410) so that it cannot open due to potential pressure surges possible during deployment of the inflatable. Such surges typically happen during an initial inflation phase of the inflatable and can be caused when the restraints break and as the inflatable unfolds. The pressure downstream of the inlet in the aspirator (e.g., P2) increases with during inflation is used to disengage the interlock 402 and allow the PRV 300 to open.

In one embodiment, the interlock 402 can be created separately from the PRV 300 and added thereto. In one embodiment, the interlock 402 can be formed by additive manufacturing.

In terms of pressures, a pressure over an area creates a force. As shown in FIG. 4, there are seal areas where various pressures can be applied. The areas of interest are the PRV seal area As0, the upper piston seal As1, the area of the seal assembly As2, and the lower piston seal area As3.

If the downward force of P1*As1, the frictional force Ff of the O-ring seals that oppose movement of the piston 410 and the downward force P2*As3 exceed the upward force of the spring Fs and the upward force P2*As2, then the piston is in the closed state shown in FIG. 4 and does not allow the PRV 300 to open. However, if this situation is reversed, then the piston is in open state as shown in FIG. 5 and the PRV 300 can open when P2 exceeds the opening pressure of the PRV 300.

The skilled artisan will realize that based on expected time of an initial opening phase of the inflatable, the upward force component P2*As2 can be manipulated to control the timing of the interlock opening by varying As2. State in equation terms, the interlock 402 keeps the PRV 300 from opening when:

$$(P1*As1+P2*As3+Ff)>(P2*As2+Fs);$$

and allows it to open when:

$$(P2*As2+Fs)>(P1*As1+P2*As3+Ff).$$

The skilled artisan will realize that the interlock 402 can be sized and arranged based on the opening pressure of an existing PRV 300 and, as such, can achieve the technical effect of delaying its opening during an initial phase of the inflation of an inflatable and can afterwards allow the PRV 300 to operate in its normal manner. That is, after the initial phase, the PRV 300 operation is not affected by the interlock 402.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aspirator for use in an aircraft evacuation inflatable device inflation system, the aspirator including:
   a barrel:
   a first inlet configured to receive a primary flow of pressurized gas at a first pressure (P1) during inflation of the aircraft evacuation inflatable device;
   a second inlet configured to a secondary flow in the form of atmospheric air; and
   a pressure relief valve and interlock combination attached to the barrel, wherein the interlock receives the primary flow and a downstream flow from the barrel, wherein the interlock causes the pressure relief valve (PRV) to remain closed during an initial phase of inflation of aircraft evacuation inflatable device wherein the pressure relief valve is directly connected to the barrel and receives inlet air from the barrel at a second pressure (P2);
   wherein the interlock includes:
   an interlock body; and
   a piston disposed in the interlock body and that moves from an open position to a close position within the interlock body, wherein the piston includes a seal assembly shaped and configured to divide the interlock body into an upper region and a lower region, the aspirator further including a downstream duct connected to the barrel that, in operation, receives air from the barrel at the second pressure (P2) and provides it to the interlock body in the lower region;
   wherein the interlock body includes a piston receiving region formed, sized and configured to receive an upper portion of the piston and allow for the piston to move from the closed to the open position, the aspirator further comprising:
   an upstream duct that carries a portion of the primary flow received at the first inlet to the piston receiving region;
   wherein, in operation, the primary flow exerts a downward force on the piston.

2. The aspirator of claim 1, wherein, in operation air received in the lower region exerts an upward force on the piston.

3. The aspirator of claim 1, wherein the interlock includes one or more springs disposed in the lower region.

4. The aspirator of claim 3, wherein:
   the PRV defines a seal area As0 on the barrel, the piston receiving region defines an upper piston seal area As1, the seal assembly has an area As2, and the lower portion includes an opening that the piston can pass through to contact the PRV that has piston seal area As3; and
   when (P1*As1+P2*As3+Ff) is greater than (P2*As2+Fs), the interlock prevents the PRV from opening, wherein Fs is the force required to compress the one or more springs and Ff is the friction force that opposes movement of the piston due to O-ring seals provided in the interlock body.

5. The aspirator of claim 4, wherein:
   the PRV defines a seal area As0 on the barrel, the piston receiving region defines an upper piston seal area As1, the seal assembly has an area As2, and the lower portion includes an opening that the piston can pass through to contact the PRV that has piston seal area As3; and when (P1*As1+P2*As3+Ff) is less than (P2*As2+Fs), the interlock allows the PRV to open where P2 can be set to values lower than the opening pressure of the PRV, wherein Fs is the force required to compress the one or more springs and Ff is the friction force that opposes movement of the piston due to O-ring seals provided in the interlock body.

6. The aspirator of claim 5, wherein the interlock is formed separately from the PRV and coupled thereto such that after the initial phase the PRV operation is not affected by the interlock.

7. An aircraft evacuation inflatable device inflation system, the system comprising:
   a pressure vessel containing pressurized inflation gas;
   a control valve
   an evacuation inflatable; and
   an aspirator as recited in claim 5.

8. The system of claim 7, wherein the interlock body includes a piston receiving region formed sized and configured to receive an upper portion of the piston and allow for the piston to move from the closed to the open position, the aspirator further comprising:
   an upstream duct that carries a portion of the primary flow received at the first inlet to the piston receiving region;
   wherein, in operation, the primary flow exerts a downward force on the piston.

9. The system of claim 8, wherein, in operation air received in the lower region exerts an upward force on the piston.

10. The system of claim 8, wherein the interlock includes one or more springs disposed in the lower region.

11. The system of claim 10, wherein:
    the PRV defines a seal area As0 on the barrel, the piston receiving region defines an upper piston seal area As1, the seal assembly has an area As2, and the lower portion includes an opening that the piston can pass through to contact the PRV that has piston seal area As3; and
    when (P1*As1+P2*As3+Ff) is greater than (P2*As2+Fs), the interlock prevents the PRV from opening, wherein Fs is the force required to compress the one or more springs and Ff is the friction force that opposes movement of the piston due to O-ring seals provided in the interlock body.

12. The system of claim 11, wherein:
    the PRV defines a seal area As0 on the barrel, the piston receiving region defines an upper piston seal area As1, the seal assembly has an area As2, and the lower portion includes an opening that the piston can pass through to contact the PRV that has piston seal area As3; and
    when (P1*As1+P2*As3+Ff) is less than (P2*As2+Fs), the interlock allows the PRV to open where P2 can be set to values lower than the opening pressure of the PRV, wherein Fs is the force required to compress the one or more springs and Ff is the friction force that opposes movement of the piston due to O-ring seals provided in the interlock body.

13. The system of claim 7, wherein the interlock is formed separately from the PRV and coupled thereto such that after the initial phase the PRV operation is not affected by the interlock.

* * * * *